United States Patent
Adema

(12) 
(10) Patent No.: US 6,286,828 B1
(45) Date of Patent: Sep. 11, 2001

(54) APPARATUS FOR ROTATING AT LEAST ONE FLAT OBJECT

(75) Inventor: Sieberen Adema, Drachten (NL)

(73) Assignee: Neopost B.V., Drachten (NL)

( * ) Notice: Subject to any disclaimer, the term of this patent is extended or adjusted under 35 U.S.C. 154(b) by 0 days.

(21) Appl. No.: 09/475,121

(22) Filed: Dec. 30, 1999

(30) Foreign Application Priority Data

Dec. 31, 1998 (NL) .................................................... 1010937

(51) Int. Cl.⁷ .................................................. B65H 29/00
(52) U.S. Cl. ......................... 271/186; 271/302; 198/404
(58) Field of Search .................................. 271/302, 303, 271/185, 186, 187; 198/404

(56) References Cited

U.S. PATENT DOCUMENTS 5,771,058 * 6/1998 Kobayashi ............................ 271/297
5,927,713 * 7/1999 Driscoll et al. ....................... 271/185

FOREIGN PATENT DOCUMENTS 649583   7/1993  (AU) .
2315131  1/1977  (FR) .
621533   1/1946  (GB) .

OTHER PUBLICATIONS

Patent Abstracts of Japan, abstract of Japanese Patent application publication No. 63136762. Aug. 6, 1988.

* cited by examiner

Primary Examiner—H. Grant Skaggs
(74) Attorney, Agent, or Firm—Burns, Doane, Swecker & Mathis, L.L.P.

(57) ABSTRACT

For rotating a flat object, a rotor is provided with a transport element for engaging an object in the rotor. A transmission element is coupled to the rotor. Between the transmission element and the transport element of the rotor, there is a transmission for causing the transport element to rotate relative to the rotor in response to rotation of the transmission element relative to the rotor. As a coupling structure between the rotor and the transmission element is arranged for retaining the transmission element relative to the rotor when rotation of the rotor is allowed, and for releasing rotation of the transmission element relative to the rotor when a switch is made to retaining the rotor, a fast, friction-low operation is enabled.

10 Claims, 2 Drawing Sheets

APPARATUS FOR ROTATING AT LEAST ONE FLAT OBJECT

This application claims priority under 35 U.S.C. §§119 and/or 365 to 1010937 filed in the Netherlands on Dec. 31, 1998; the entire content of which is hereby incorporated by reference.

FIELD AND BACKGROUND OF THE INVENTION

This invention relates to an apparatus for rotating at least one flat object. Such an apparatus is known from French patent application 2,315,131 in which an apparatus is described for turning over cards with a magnetic strip which have been inserted the other way around into an automatic machine or the like.

This apparatus has a rotor with a pair of transport rollers which define a nip for transporting and retaining a card. When the rotor is in a receiving and feeding position, a feed path extending along a sensor extends into the rotor and between the two transport rollers. A card inserted into the apparatus passes along the sensor into the area between the two transport rollers.

For driving the two transport rollers, there is provided a driving gear wheel capable of driving the transport rollers by way of transmission gear wheels and a first transmission roller. From the driving gear wheel, also a second transmission roller is driven, located on the opposite side of the rotor. The first transmission roller and the second transmission roller are suspended in a carrier with two arms which are pivotable about a common axis parallel to and spaced from the rotation axis of the rotor and are coupled to each other through a spring and a stop. The arm carrying the first transmission roller further comprises an indexing pawl which can engage in indexing recesses of the rotor for retaining the rotor in two receiving and feeding positions.

When the rotor is in any of the two receiving and feeding positions, the indexing pawl engages in one of two indexing recesses of the rotor and the first transmission roller is in engagement with a roller which is suspended coaxially and non-rotatably relative to one of the transport rollers, so that the transport rollers are driven.

If it is desired to turn the card, an electromagnet pulls towards itself the arm which carries the indexing pawl, so that the indexing pawl engaging in the indexing recess of the rotor is pulled from that indexing recess. As a result, also the first transmission roller is moved away from the roller coupled to the transport rollers, so that the drive of the transport rollers stops.

The other arm of the carrier, connected to this arm via a spring, then moves along. As a result, the second transmission roller engages a roller which is coaxial relative to the axis about which the rotor is rotatable. The rotor is thereby driven and so caused to rotate.

Shortly after the rotor has started to rotate, the electromagnet is deactivated again, so that the indexing pawl comes to lie against the outer circumference of the track in which the indexing recesses have been provided. The rotation of the rotor is subsequently stopped when the indexing pawl falls into the opposite one of the two indexing recesses. The arm carrying the first transmission roller thereby moves to its initial position again, so that the drive of the transport rollers is resumed again. The other arm then also moves back to its initial position, so that the second transmission roller's engagement of the roller coaxial with the rotor ends again.

A drawback of this apparatus is that it is not very suitable for processing heavier objects nor for achieving very high processing speeds. Objects easily slip too far, or fall from the rotor or are slung from the rotor during rotation thereof.

SUMMARY OF THE INVENTION

It is an object of this invention to provide a solution which makes it possible to process heavier objects and to achieve very high processing speeds.

This object is achieved according to this invention by providing an apparatus for rotating at least one flat object, having: a frame, a rotor which is rotatably suspended relative to the frame, which rotor is arranged for receiving an object in the rotor and comprises: at least one passage for at least receiving or feeding specimens of the objects and at least one transport element having a circulating circumferential surface for engaging a specimen of the objects in the rotor for bringing a specimen of the objects via the passage into or out of the rotor, a transmission element, a coupling structure between the transmission element and the rotor, a transmission between the transmission element and the at least one transport element of the rotor for causing the at least one transport element to rotate relative to the rotor in response to rotation of the transmission element relative to the rotor, a positioning structure for retaining the rotor in at least one position relative to the frame, and a drive for driving the transmission element, while the coupling structure is arranged for: retaining the transmission element relative to the rotor in a rotation condition in which the positioning structure allows rotation of the rotor relative to the frame, and releasing rotation of the transmission element relative to the rotor upon transition to a transport condition in which the positioning structure retains the rotor relative to the frame.

As a consequence, objects can be stopped and retained in the rotor very fast and reliably, without this requiring that in the transport condition a great friction occurs for stopping the transport elements when the drive thereof is discontinued.

Further objects, features, effects and details of this invention appear from the claims and the following description of an exemplary embodiment presently preferred most, with reference to the drawings.

DETAILED DESCRIPTION

Figure 1:
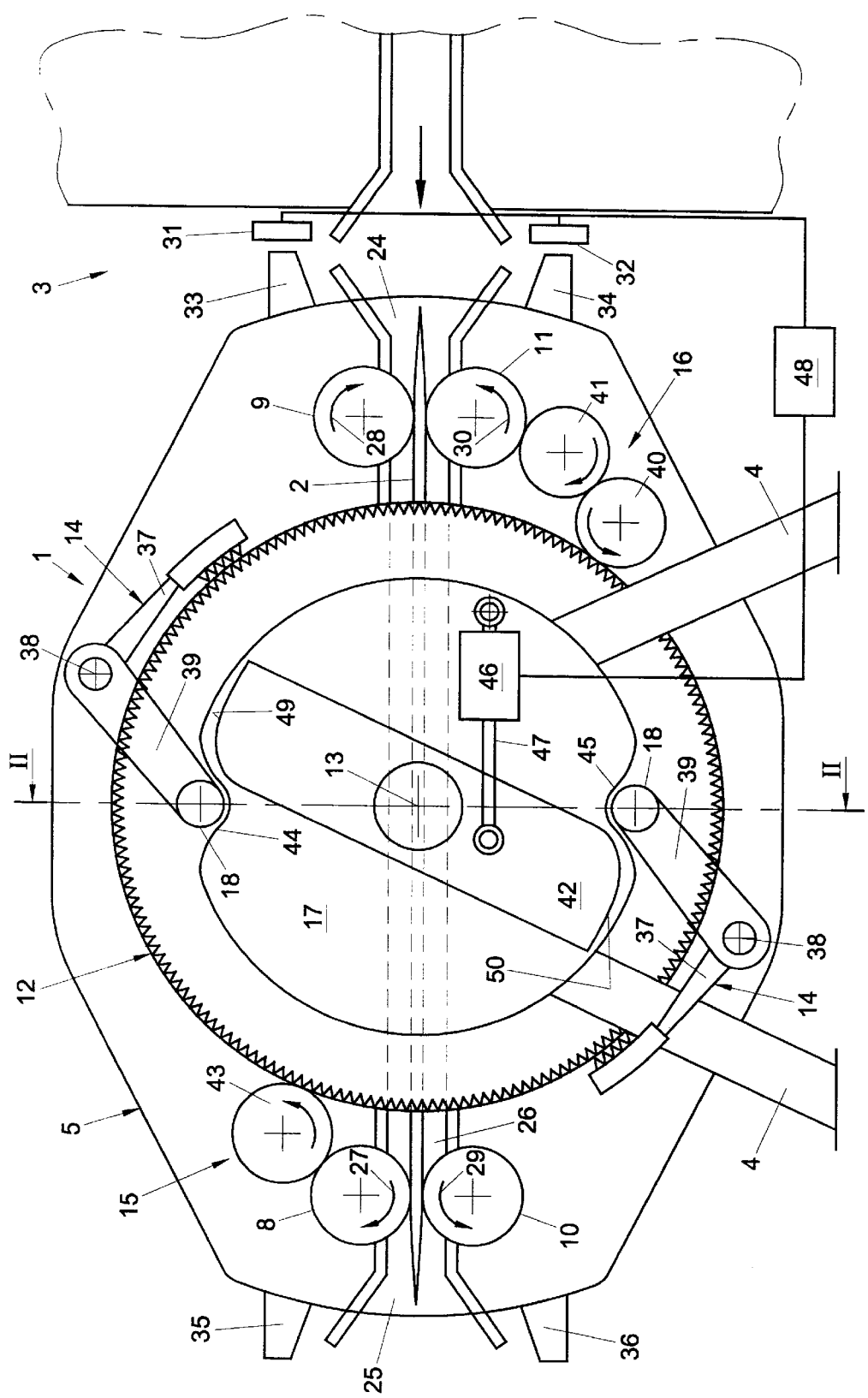
FIG. 1 is a diagrammatic representation in side elevation of an apparatus according to the invention.

The apparatus 1 according to the exemplary embodiment described hereinafter is intended for rotating filled envelopes 2 which have been fed from an inserter system, of which an exit portion 3 is visible in FIG. 1. Turning over envelopes can be necessary, for instance, if a franking machine downstream of the inserter system is arranged for printing envelopes on a side opposite to the address side of the envelopes in the position in which they leave the inserter system. It may also be necessary to turn over envelopes for sorting purposes and for presenting envelopes with the desired side facing a user.

Figure 2:
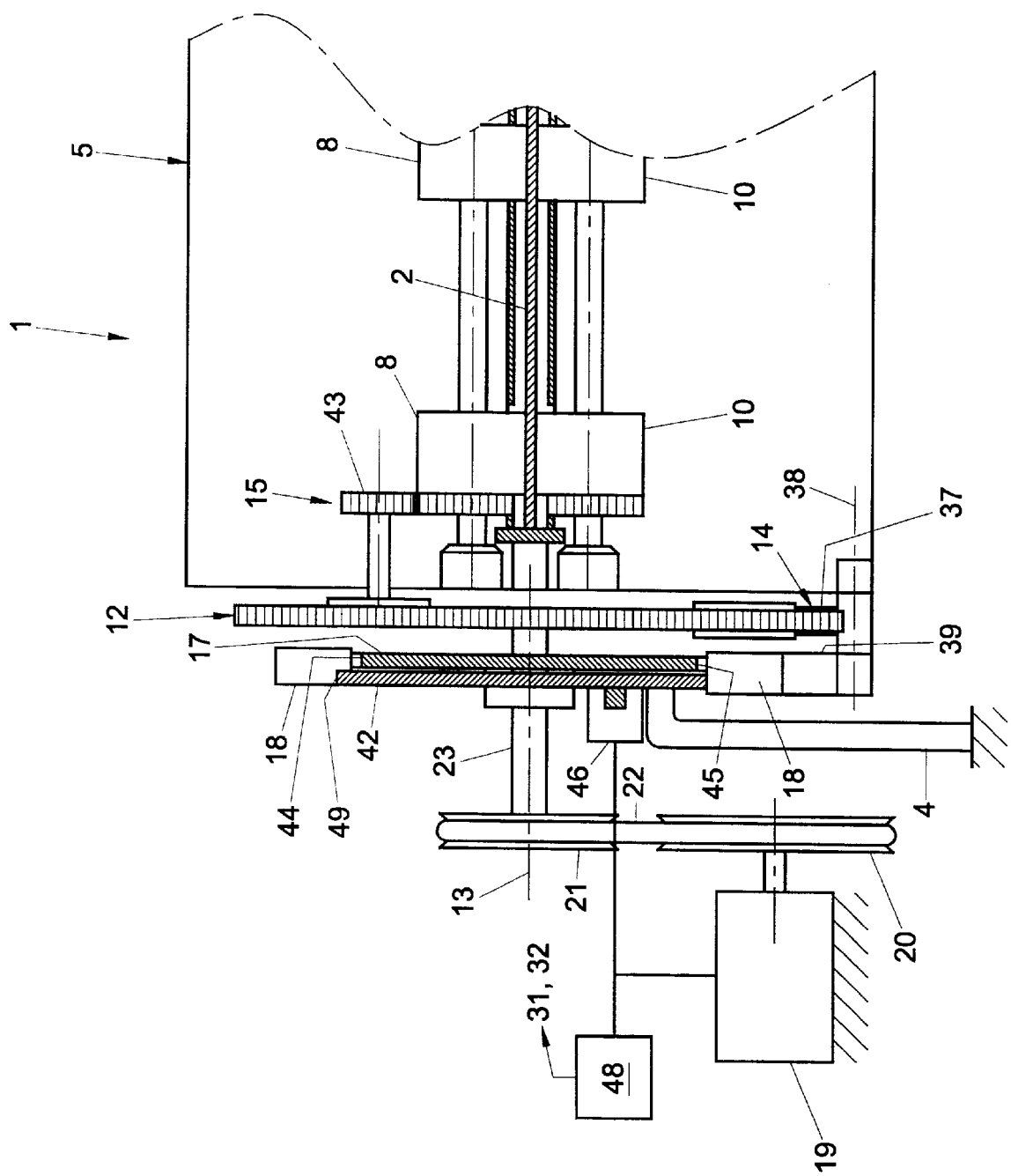
FIG. 2 is a representation in cross section taken along the line II—II in FIG. 1.

The apparatus according to the invention as proposed hereinafter by way of example is composed of inter alia:

a frame, of which the drawing shows parts 4 while the rest has been omitted for the sake of clarity, a rotor 5 which is rotatably suspended relative to the frame 4 and which is arranged for receiving an object, such as the envelope 2 shown, and comprises rotary transport elements, here in the form of transport rollers 8–11, a transmission element 12, which, according to this example, is designed as a transmission gear wheel suspended coaxially with respect to the rotation axis 13 of the rotor 5, coupling grippers 14 between the transmission gear wheel 12 and the rotor 5, transmissions 15, 16 between the transmission gear wheel 12 and the transport rollers 8, 10 and 9, 11, respectively, of the rotor 5 for rotating the transport rollers 8–11 relative to the rotor 5 in response to rotation of the transmission gear wheel 12 relative to the rotor 5, a positioning structure in the form of an indexing disc 17 and indexing pawls 18 cooperating therewith, for keeping the rotor 5 in the two different positions relative to the frame 4, and a drive formed by a motor 19 and a transmission with pulleys 20, 21, a belt 22 and a drive shaft 23 (shown only in FIG. 2) for driving the transmission gear wheel 12.

The rotor 5 further comprises passages 24, 25 for receiving the envelopes 2 to be inverted and feeding them when inverted. Between the passages 24, 25 extends a guide track 26 for guiding envelopes 2 displaced by the transport rollers 8–11. The transport rollers 8–11 have a circulating circumferential surface and are so arranged that these circumferential surfaces can engage an envelope 2 to be transported in the guide track 26 in the rotor 5. In the position of the rotor 5 as shown, one passage 25 of the passages is located in a position for bringing an envelope 2 via that passage 25 out of the rotor. In that position of the rotor 5, the other one 24 of the passages is located in a position for receiving an envelope 2 from the inserter system 3 and for feeding a received envelope 2 via that passage 24 into the rotor.

The transmissions 15, 16 are differently designed to cause the transport rollers 8, 10 on the one hand and the transport rollers 9, 11 on the other to rotate with a mutually identical sense of rotation upon rotation of the transmission gear wheel 12. For that purpose, the transmission 16 is equipped with a set of transmission wheels 40 and a reversing wheel 41, while the transmission 15 is equipped exclusively with a set of transmission wheels 43.

By rotating the rotor 5, after an envelope 2 has been received therein, through half a turn (180°) about the rotation axis 13, an envelope 2 in the rotor is turned over. After being turned over, the envelope 2 can be discharged by rotating the transport rollers 8–11 in a direction opposite to the arrows 27–30.

The coupling grippers 14 are arranged for retaining the transmission gear wheel 12 relative to the rotor 5 in a rotation condition in which the positioning structure 17, 18 allows rotation of the rotor 5 relative to the frame 4, and for releasing rotation of the transmission gear wheel 12 relative to the rotor 5 upon transition to a transport condition in which the positioning structure 17, 18 retains the rotor 5 relative to the frame 4.

As the coupling grippers 14 allow rotation of the rotor 5 relative to the transmission gear wheel 12 when the positioning structure 17, 18 retains the rotor 5 relative to the frame 4, the resistance upon rotating the transmission gear wheel 12 relative to the rotor 5 is very low, while the transmission gear wheel 12 upon rotation of the rotor 5 is very reliably retained thereby and the transmission gear wheel 12 can also be stopped very fast.

To reverse the sense of rotation of the transport rollers 8–11, it is necessary to reverse the sense of rotation of the transmission gear wheel 12. In order to avoid unnecessary reversal of the sense of rotation of the transmission gear wheel 12, it is preferred for the rotor 5 to be carried along with the transmission gear wheel 12 alternately clockwise and counterclockwise.

To be able to determine whether the rotor 5 approaches or has reached an end position, two ultrasound sensors 31, 32 are mounted, and the rotor 5 is provided with noses 33–36 which are located very closely in front of the distance sensors 31, 32 when the rotor 5 is in a position for receiving and feeding envelopes 2. The distance of the sensors 31, 32 to the circumference of the rotor 5, if it is non-circular in shape, is an indication of the position of that rotor 5. By virtue of the noses 33–36, the position for receiving and feeding envelopes 2 can be sensed particularly accurately because the noses 33–36 in that position bring about a particularly strong reduction of the distance between the sensors 31, 32 and the rotor 5.

Although the coupling structure 14 and the positioning structure 17, 18 can be designed as separate structures which are controlled in coordination, it is advantageous for the purpose of constructional and control-technical simplicity to couple the coupling structure 14—as in the example described—to the positioning structure 17, 18 to cause the coupling structure 14 to engage upon release of the positioning structure 17, 18 and vice versa.

In the apparatus according to this example, this has been achieved by providing the coupling grippers 14 with tumblers 37 and by providing the positioning structure with tumblers 39 which carry the indexing pawls, and suspending the tumblers 37, 39 such that they are mutually fixed but are jointly pivotable about common rotation axes 38. Thus, the tumblers 37 move the coupling grippers 14 to their engaging position when the tumblers 39 move as the indexing pawls 18 come out of the engaging position. Obviously, there are many other possible configurations in the form of which this principle can be utilized. Thus, the couplings and/or the indexing pawls can engage a transmission element or indexing structure, for instance, from the inside or axially.

For operating both the coupling grippers 14 and the positioning structure 17, 18, there is provided an operating element in the form of a switching element 42 which is pivotable about the rotation axis 13 of the rotor 5 and which is arranged for cooperation with indexing positions 44, 45 which are provided on the indexing disc 18. The switching element 42 is movable between the position shown in solid lines, in which the indexing positions 44, 45 are cleared for receiving the indexing pawls 18, and a position represented in chain-dotted lines, in which the indexing pawls 18 are urged from the recesses. For driving these movements of the switching element 42, an electromagnet 46 is provided which is connected to the switching element 42 through an operating rod 47.

By energizing the electromagnet 46, the indexing positions 44, 45 are deactivated for allowing the rotor 5 to rotate freely. When deactivating the indexing positions 44, 45, the indexing pawls 18 are urged outwards, whereby the tumblers 39 pivot outwards about the axes 38. As a result of this, in turn, the tumblers 37 of the coupling grippers 14, which are fixedly coupled to the tumblers 39 of the indexing pawls 18, pivot inwards and set the coupling grippers 14 carried by the rotor 5 into engagement with the transmission gear wheel 12. As a result, relative rotation of the rotor 5 and the transmission gear wheel 12 is prevented, so that the rotor 5 is carried along by the transmission gear wheel 12. The indexing pawls 18, designed as bearing rollers, then run over the circumference of the indexing disc 17. As a result, the coupling grippers 14 remain reliably in engagement during rotation of the rotor 5, as long as the pawls 18 have not reached an activated indexing position yet. It is thus moreover ensured that the transport rollers 8–11, which are driven by relative rotation of the transmission gear wheel 12 relative to the rotor 5, stand still as long as the rotor 5 is not in an indexed position.

As this system utilizes a central operating element for activating and deactivating indexing positions, the number of indexing positions can be increased in a particularly simple manner, without this leading to a proportional increase of the complexity and the number of parts of the construction.

Although control of the motor 19 is possible without having knowledge of the position of the rotor 5—for instance by only briefly energizing the motor 19 after release of rotation of the rotor 5, and subsequently allowing the rotor 5 to run out until the indexing pawls 18 fall into the indexing positions 44, 45—it is desirable, especially in the case of rotation of the rotor 5 at higher speeds, to control the motor 19 such that the rotor 5, shortly before reaching an indexed position, is slowed down and reaches the indexed position at a low speed. For that purpose, the sensors 31, 32 for detecting the position of the rotor 5 are coupled to a control system 48 which is further coupled to the central switching element 42, or at least to the electromagnet 46 for operating the central switching element 42. This control system 48 is arranged for operating the central switching element 42 (through the electromagnet 46) depending on the detected position of the rotor 5. This makes it possible to stop the rotor 5 in different predetermined positions by means of a single central switching element 42. This is especially advantageous according as the number of indexing positions 18, and hence the number of positions in which the rotor 5 can be stopped, is greater, for instance for selectively discharging envelopes in different directions.

The switching element 42 is provided with two cam surfaces 49, 50 remote from the rotation axis 13 and remote from each other in the sense of rotation. These cam surfaces 49, 50 are each associated with a particular indexing position 44 and 45, respectively, and are arranged for cooperation with that indexing position for activating and deactivating that associated indexing position 44 and 45, respectively.

The positioning structure and in particular the indexing pawls 18 and the indexing positions 44, 45 are arranged for engaging over an engagement path from the rotation condition to the transport condition. The rotor 5 is then limitedly rotatable relative to the frame 4 while the indexing pawls 18 engage from the rotation condition to the transport condition, and the coupling grippers 14 and the tumblers 37, 39 are arranged for the at least limited release of rotation of the transmission gear wheel 12 relative to the rotor 5 before the indexing pawls 18 have traversed the engagement path. The effect of this is that the transmission gear wheel 12, upon reaching an indexing position, does not need to be brought to a halt but can continue to rotate, first rotating along with the rotor 5, and subsequently, with increasing rotational speed relative to the rotor 5 coming to a halt, causing the transport rollers 8–11 to rotate.

For achieving this effect, according to this example, the shape of the indexing positions 44, 45 and of the indexing pawls 18 is selected such that the tumblers 37, 39, when the rotor 5 approaches an indexing position and the indexing positions 44, 45 have been cleared by the switching element 42, already start to move some time before the indexing position has been reached, for the release of the coupling grippers 14. Especially of importance in this connection is that the indexing positions have flowingly rising flanks.

For utilizing this effect with advantage, it is of importance that the sense of rotation of the transmission gear wheel 12 is reversed each time upon receipt of an envelope 2 in the rotor 5, so that after the inversion of the rotor 5, continued rotation of the transmission gear wheel 12 results in transport of the envelope 2 in a direction away from the inserter system 3.

Although flowingly configured flanks of the indexing positions 44, 45 can contribute to the prevention of shocks during stopping of the rotor 5, it is advantageous for a smooth and low-noise operation if elastic positioning elements are provided which, while exerting a readjusting force, allow deflections of the rotor from a position in which it is being retained. In the apparatus according to this example, this has been realized in that the indexing pawls 18 have an elastic tread. It is also possible, however, to incorporate greater elasticity, for instance, by coupling the indexing disc 17 resiliently to the frame 4.

What is claimed is:

1. An apparatus for rotating at least one flat object, comprising:

a frame, a rotor which is rotatably suspended relative to said frame, which rotor is arranged for receiving an object in the rotor and comprises: at least one passage for at least receiving or feeding specimens of said objects and at least one transport element having a circulating circumferential surface for engaging a specimen of said objects in the rotor for bringing a specimen of said objects via said passage into or out of the rotor, a transmission element, a coupling structure between said transmission element and said rotor, a transmission between said transmission element and said at least one transport element of the rotor for rotating said at least one transport element relative to said rotor in response to rotation of said transmission element relative to said rotor, a positioning structure for retaining said rotor in at least one position relative to said frame, and a drive for driving said transmission element, wherein said coupling structure is arranged for: retaining said transmission element relative to said rotor in a rotation condition in which said positioning structure allows rotation of said rotor relative to said frame, and releasing rotation of said transmission element relative to said rotor upon transition to a transport condition in which said positioning structure retains said rotor relative to said frame.

2. An apparatus according to claim 1, wherein said coupling structure is coupled to said positioning structure for causing said coupling structure to engage upon release of said positioning structure and vice versa.

3. An apparatus according to claim 1, wherein the positioning structure is arranged for engaging over an engagement path from said rotation condition to said transport condition, said rotor being limitedly rotatable relative to said frame while the positioning structure engages from said rotation condition to said transport condition, and wherein said coupling structure is arranged for the at least limited release of rotation of said transmission element relative to said rotor before the positioning structure has traversed said engagement path.

4. An apparatus according to claim 1, wherein said positioning structure comprises at least one elastic positioning element for allowing, while exerting a readjusting force, deflections of said rotor from a position in which it is being retained.

5. An apparatus according to claim 1, wherein the positioning structure comprises: an indexing structure having at least two indexing positions and at least one pivotable operating element arranged for cooperation with said indexing positions.

6. An apparatus according to claim 5, further comprising an operating structure for activating and deactivating said indexing positions.

7. An apparatus according to claim 6, wherein said operating structure comprises a central operating means, said operating structure being arranged for simultaneously activating and deactivating said indexing positions.

8. An apparatus according to claim 7, further comprising at least one sensor for detecting the position of said rotor, a control system coupled to said at least one sensor and to said central operating element, said control system being arranged for driving said central operating element in response to a particular detected position of said rotor.

9. An apparatus according to claim 6, wherein said operating structure comprises a switching element which is pivotable about a rotation axis of said rotor.

10. An apparatus according to claim 9, wherein said switching element comprises at least two cam surfaces remote from said rotation axis and remote from each other in the sense of rotation, which cam surfaces are each associated with a particular indexing position and are arranged for cooperation with that indexing position for activating and deactivating that associated indexing position.

* * * * *